United States Patent
Ramalingam et al.

(10) Patent No.: US 11,694,124 B2
(45) Date of Patent: Jul. 4, 2023

(54) ARTIFICIAL INTELLIGENCE (AI) BASED PREDICTIONS AND RECOMMENDATIONS FOR EQUIPMENT

(71) Applicant: ACCENTURE GLOBAL SOLUTIONS LIMITED, Dublin (IE)

(72) Inventors: Rajarajan Thangavel Ramalingam, Bangalore (IN); Vladimir Valeryevich Ryabovol, Windham, NH (US); Auri Priyadharshini Munivelu, Bangalore (IN); Ramanathan Lakshmanan, Bangalore (IN); Ravi Kanth Vinnakota, Bangalore (IN); Sunil Kumara D S, Hassan District (IN); Basavaraj Chidanandappa, Bangalore (IN); Venkata Rama Krishna Perumalla, Chebrole (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1055 days.

(21) Appl. No.: 16/441,941

(22) Filed: Jun. 14, 2019

(65) Prior Publication Data

US 2020/0394533 A1 Dec. 17, 2020

(51) Int. Cl.
*G06N 20/00* (2019.01)
*G06N 20/20* (2019.01)
(Continued)

(52) U.S. Cl.
CPC ......... *G06N 20/20* (2019.01); *G06F 18/2113* (2023.01); *G06F 18/2185* (2023.01);
(Continued)

(58) Field of Classification Search
CPC ..... G06Q 50/04; G06Q 30/0283; G06N 20/20
(Continued)

(56) References Cited

U.S. PATENT DOCUMENTS 9,959,563 B1 * 5/2018 Wu ................... G06Q 30/0631
11,100,560 B2 * 8/2021 Parker ............... G06Q 30/0603
(Continued)

FOREIGN PATENT DOCUMENTS

| CA | 3034417 A1 * | 12/2019 | ........... G06Q 10/087 |
|---|---|---|---|
| CN | 110392899 A * | 10/2019 | ............. G06F 17/10 |
| WO | 2016004062 | 1/2016 | |

OTHER PUBLICATIONS

Louis Columbus, "10 Ways Machine Learning Is Revolutionizing Sales", Dec. 26, 2018, Forbes.com, 7 pages (Year: 2018).*

*Primary Examiner* — Shannon S Campbell
*Assistant Examiner* — Freda A Nelson
(74) *Attorney, Agent, or Firm* — Mannava & Kang, P.C.

(57) ABSTRACT

An Artificial Intelligence (AI)-based attribute prediction system generates predictions for attributes of highly customized equipment in response to received user requests. Processed historical data is initially used to generate feature combinations which are then employed along with a plurality of statistical and machine learning (ML) models in order to identify a best scoring model-feature combination in two selection cycles using multiple selection criteria. The predictions for an attribute are generated by the best scoring model and feature combination. Various insights regarding the features affecting the attribute can be additionally derived to provide recommendations to the user.

19 Claims, 12 Drawing Sheets

(51) Int. Cl.
  *G06Q 50/04*     (2012.01)
  *G06Q 30/0201*   (2023.01)
  *G06F 18/23*     (2023.01)
  *G06F 18/2113*   (2023.01)
  *G06F 18/21*     (2023.01)

(52) U.S. Cl.
  CPC ............ *G06F 18/23* (2023.01); *G06N 20/00* (2019.01); *G06Q 30/0206* (2013.01); *G06Q 50/04* (2013.01)

(58) Field of Classification Search
  USPC .................................. 705/400, 7.35; 706/12
  See application file for complete search history.

(56) References Cited

U.S. PATENT DOCUMENTS

| | | | |
|---|---|---|---|
| 2007/0260626 A1* | 11/2007 | Reisz | G06Q 30/0268 |
| 2016/0092898 A1* | 3/2016 | Wang | G06Q 30/0206 |
| | | | 705/7.31 |
| 2018/0060738 A1 | 3/2018 | Achin et al. | |
| 2018/0247325 A1* | 8/2018 | Melzer | G06Q 30/0206 |
| 2018/0349795 A1 | 12/2018 | Boyle et al. | |
| 2019/0156417 A1 | 5/2019 | Zhao et al. | |

* cited by examiner

FIG. 10

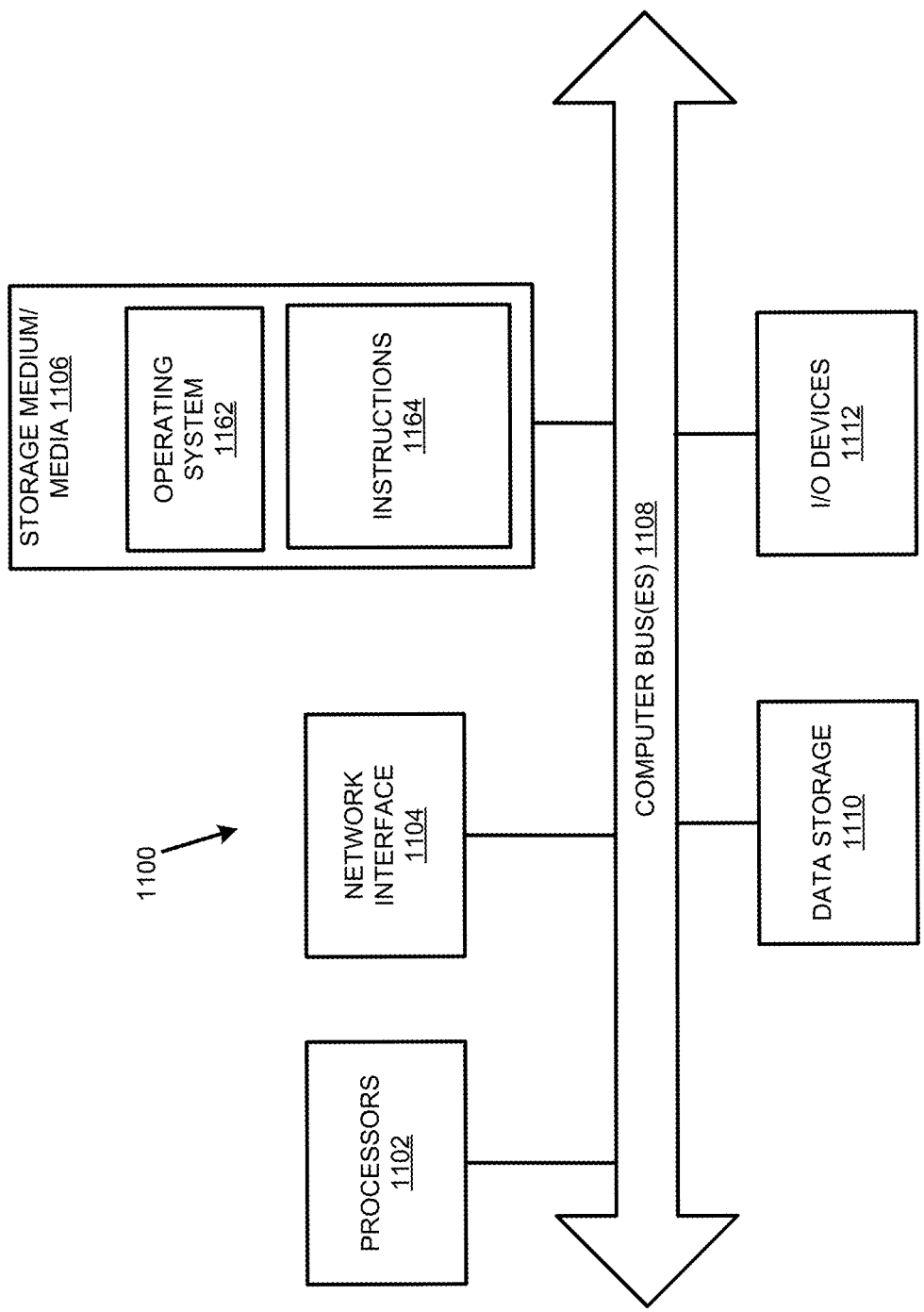

ARTIFICIAL INTELLIGENCE (AI) BASED PREDICTIONS AND RECOMMENDATIONS FOR EQUIPMENT

BACKGROUND

In order to identify optimization opportunities in manufacturing processes, the manufactures need to understand the drivers of the various key performance indicators (KPIs) of the processes such as cost, demand etc. However suppliers rarely reveal detailed information regarding their manufacturing processes and costs. In fact, factory systems often group many activities together as machining, heat treatment etc. As a result, it is difficult to identify the process KPIs involved in producing the individual components in the equipment. Existing techniques that are developed for predicting these KPIs may work adequately for mass manufactured items. However, such techniques fail to produce accurate numbers for highly customized equipment which include different components from different sources.

BRIEF DESCRIPTION OF DRAWINGS

Features of the present disclosure are illustrated by way of examples shown in the following figures. In the following figures, like numerals indicate like elements, in which:

FIG. 10 shows a tabular form including the various possible feature combinations and model scores obtained in accordance with the examples disclosed herein.

FIG. 11 illustrates a computer system that may be used to implement the AI-based attribute prediction system in accordance with the examples disclosed herein.

DETAILED DESCRIPTION

Figure 1:
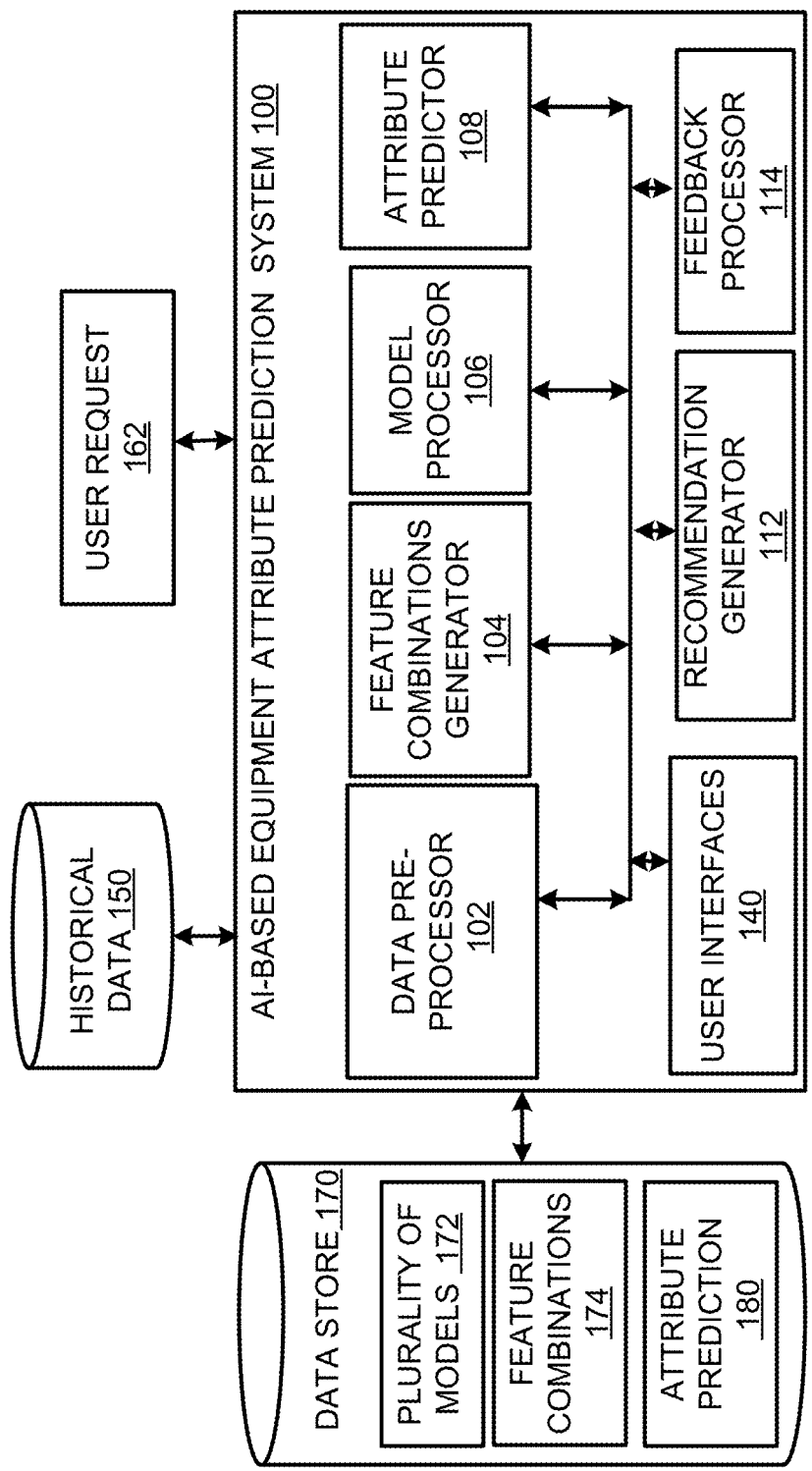
FIG. 1 is a block diagram that shows an Artificial Intelligence (AI) based equipment attribute prediction system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An Artificial Intelligence (AI)-based equipment attribute prediction system that generates predictions of one or more attributes for customized equipment is disclosed. The attribute prediction system disclosed herein provides a technical solution to a technical problem of identifying an appropriate model for predicting attributes such as costs for highly customized equipment. Existing cost models such as the clean sheet model cannot accurately predict the price for highly customized equipment wherein the various components are highly customized and may be acquired from different vendors. In fact, the uncertainty associated with the information regarding components used in the customized equipment, the materials the components are made of, the costs associated with the components and the pricing of the components by different vendors etc. contributes to the difficulty in predicting the attributes of such highly customized equipment. By using real world historical data to generate a plurality of models, the attribute prediction system is able to capitalize on the available information. Moreover, due to the highly customizable nature of the equipment, identifying features that most affect the equipment attribute being predicted can lead to greater prediction accuracy. In this regard, the attribute prediction system generates the various feature combinations that enable identifying the features that most influence the attribute being predicted in addition to providing the user greater control or flexibility in varying the input factors and values to examine their impact on the output variables. Furthermore, the usage of different types of statistical and ML models further enhances the prediction accuracy as a prediction algorithm that best predicts a given equipment attribute is identified for each of the attributes. Furthermore, the usage of models optimized to particular attributes enables faster run time for the models and reduces the cycle time of the model development process. Also, with the insights obtained from analyzing the models generating the predictions, the user can gain knowledge regarding the factors that need to be worked on in order to achieve goals associated with the attributes such as cost savings, increased demand, greater margins etc.

The attribute prediction system as disclosed herein employs the plurality of models in conjunction with combinations of various features of an attribute of the customized equipment in order to generate the attribute prediction. The attributes to be predicted can include characteristics such as cost or demand of customized machinery or equipment wherein each item or each equipment needs detailed specifications for the attribute determination. The attribute prediction system initially accesses historical data including the various features and the attribute values that were collected over a long period of time. Different feature combinations are generated from the historical data. A plurality of models including statistical and machine learning (ML) models are used with the feature combinations for identifying a best scoring model and feature combination for obtaining the attribute prediction.

The historical data can be initially pre-processed in order to enable generation of accurate attribute predictions. The historical data can include errors such as missing values and outliers. If the data of a particular feature has more than a threshold number of missing values, e.g., more than 40% missing values, then the feature can be discarded from being used for the attribute prediction generation. However, if the missing values are less than the threshold number, then each of the missing values can be replaced with a statistically appropriate value such as the median value of that feature. Similarly, outliers in the historical data can be treated using inter quartile range (IQR) methodologies. The outliers can be replaced by the median values. Furthermore, the historical data can include costs or other amounts in various currencies which are converted into a common currency during the data preprocessing. As mentioned above, the historical data includes data from different time periods. Therefore, in order to equalize the data from different time periods, the various quantities may be further processed with the corresponding indices. For example, a steel price index may be applied on the steel prices in order to equalize the historical data from different years.

The historical data that has been thus processed is used in the subsequent steps of the attribute prediction generation. The features from the historical data are identified and the various possible combinations of the features are generated. In an example, the feature combinations can be generated using code. Various model and feature combinations can be generated by using each of the feature combinations with one of a plurality of models. The plurality of models can include both statistical models and machine learning (ML) models. In a first selection cycle, a scoring scheme including first model selection criteria are applied to each of the model-feature combinations that are generated. The first selection criteria can include root means square error (RMSE) estimation in order to determine the accuracy of the plurality of models with the feature combinations. In addition, the top ten models from the model-feature combinations can be selected based on the RMSE scores and multi sample testing which enables determining the consistency of the top ten models. Based on the accuracy and consistency, top N models (N being a natural number) are further selected for a second selection cycle.

The second selection cycle involves application of second selection criteria on the top N model-feature combinations. The second selection criteria can include obtaining mean absolute percentage error (MAPE) for each of the top N model-feature combinations. One of the top N models with the lowest MAPE score is selected as the best scoring model for generating the attribute predictions for the customized piece of equipment. Similar procedure of using pre-processed historical data to generate feature combinations and testing the various model-feature combinations for the selection of the best scoring model can be implemented for obtaining other attributes for the same customized equipment or for obtaining other attributes for other equipment. Thus, for each attribute of each equipment category, the best scoring model-feature combination can be generated and stored for use when the attribute predictions are requested.

The attribute prediction process can be initiated by receiving a user request. The user request can include information such as but not limited to, the attribute which is to be predicted, the machinery or equipment associated with the attribute including the number of equipment for which the attributes are sought and the specifications or features of each piece of equipment. Therefore, a single user request can be used to obtain attribute predictions for multiple pieces of equipment. In an example, the multiple pieces of equipment can include those belonging to one category with different specifications. The user request is analyzed by applying language processing techniques in conjunction with key-word matching in order to obtain the information included therein. Based on the attribute prediction being requested, a best scoring model-feature combination is selected. The values for the features in the best scoring model and features combination are taken from the user request and fed to the best scoring model for obtaining the attribute predictions. If the attribute is to be predicted for multiple pieces of equipment, then multiple instances of the best scoring model are loaded and the feature values for each piece of equipment are fed to the respective instance of the best scoring model to obtain the respective attribute prediction.

The accuracy of the attribute predictions thus obtained can be determined by statistical techniques such as variance estimation. In an example, the actual attribute value can be obtained and the variance estimated between the actual and the predicted attribute values. Additionally, various insights may be drawn from the model used for the attribute prediction. The coefficients in the equation representing the best scoring model for the attribute prediction can be analyzed for sign and magnitude. Therefore, those features corresponding to the coefficients with large magnitude can be identified as those with greater impact on the attribute while the sign of the coefficients can convey the type of relationship between the attribute and the feature(s). Similarly, sensitivity analysis as outlined further herein can be carried out to determine the features that most or least affect the attribute value.

FIG. 1 is a block diagram that shows the AI-based equipment attribute prediction system 100 in accordance with examples disclosed herein. The attribute prediction system 100 generates attribute predictions for one or more attributes of equipment such as customized machinery based on a user request 162. The customized machinery can include large or small industrial machinery that are manufactured to specifications wherein the cost of the customized equipment depends on the specifications. Such customized equipment can be made for various industry segments such as but not limited to, oil and gas industry, chemical processing plants, factories which manufacture consumer goods and the like. The attribute prediction system 100 generates various statistical and ML models for predicting one or more attributes of the customized equipment based on the user request 162. The predicted attributes of the customized equipment can include, key performance indicators (KPIs) such as the price, demand, margins, market share etc. In addition to generating the attribute predictions, the attribute prediction system 100 further analyzes the models and/or the factors used to generate the attribute predictions in order to provide recommendations.

The attribute prediction system 100 includes a data preprocessor 102, a feature combinations generator 104, a model processor 106, an attribute predictor 108, a recommendation generator 112 and a feedback processor 114. The attribute prediction system 100 initially generates a plurality of models 172 using historical data 150. The historical data 150 includes domain-specific data using which, the attribute prediction system 100 is configured to respond to particular user requests for attribute predictions. In an example, the historical data 150 includes data that has been collected over a large time period e.g., over the years regarding the features that make up or contribute to a particular attribute of the customized equipment. For example, if the attribute pertains to a cost of the customized equipment, then the historical data 150 includes tender data over the years such as the costs quoted by various suppliers for the equipment and any cost breakup which indicates costs of each component that makes up the total cost of the equipment along with the historic contract data. By way of illustration and not limitation, if the customized equipment pertains to a customized crane for lifting and carrying earth/equipment etc. then the historical data 150 can include the cost of the customized cranes obtained from different suppliers over the years, the specifications of the customized cranes such as the boom length, the grade of metals used, the number of customized cranes ordered etc. The cost components can include specific items of features that contribute to the cost of the customized crane such as steel used for building the crane and labor employed for building the crane etc. The historical data 150 can include data that has been collected over various time periods in different years and hence tracks the cost and/or the cost components over the years. The contract data can include any particular additional costs that occur over the time period of the contract etc. The historical data 150 can include structured data such or unstructured data.

The historical data 150 which is processed by the data pre-processor 102 is then employed by the features combinations generator 104 to generate every possible combination of features. The combination of the features of course would depend on the nature or the data type of features so that features of similar data types, e.g., numerical, binary or string data types can be combined with other features of the same data types using the corresponding arithmetic, binary or string operators. In an example, the feature combinations generator 104 can include code for generating the feature combinations 174. By way of illustration and not limitation, if the cost attribute has three numerical features or metrics influencing it, namely, metric 1, metric 2 and metric 3, the feature combinations generator 104 can generate various possible feature combinations based on the nature of the features and the operations that are to be used for combining them. For each arithmetic operation for the three metrics named above, $2^3-1=7$ unique combinations of features are possible including metric 1, metric 2, metric 3, metric 1\*metric 2, metric 1\*metric 3, metric 2\*metric 3, and metric 1\*metric 2\*metric 3. Reverting to the example of the cost of the customized crane, the features can include the cost of the materials, the labor cost, the specifications of the crane etc. Thus, the feature combinations generator 104 can generate every possible unique combination of features which may range to tens or even hundreds of feature combinations 174.

The feature combinations 174 thus generated are employed by the model processor 106 that analyzes combinations of a plurality of models 172 with the feature combinations 174 and identifies a top N models for further analysis in a first selection cycle. In an example, the model processor 106 can process fifteen or more models with the feature combinations 174. Thus, when fifteen models are used with the aforementioned 7 feature combinations, 105 models+feature combinations are generated. Using certain first model selection criteria as detailed further herein, the model processor 106 selects the top five models (including their corresponding feature combinations) for further analysis i.e., N=5 in the first selection cycle. Alternately, it can be understood that five models with the corresponding five feature combinations are selected in the first selection cycle. Of course, N can take different values depending on the accuracy of the feature combinations with the plurality of models 172. The model processor 106 can further apply second selection criteria on the top N models in a second selection cycle to identify a best scoring model or the model with the highest score under the second selection criteria to be employed for generating the attribute predictions. Whenever the user request 162 for prediction on the particular attribute is received, the best scoring model selected in the second selection cycle using the second selection criteria is used for the generation of predictions for that attribute. In an example, the best scoring model and feature combination selected in the second selection cycle is stored to the data store 170 for use in generating predictions for an attribute. Similarly, different combinations of the best scoring model and feature combinations can be identified for predicting different attributes. In an example, multiple such best scoring model and feature combinations for predicting different attributes can be identified and stored to the data store 170 for retrieval based upon the attribute in the user request 162.

When the user request 162 is received, the attribute predictor 108 identifies data values for the features associated with the attribute included in the user request 162. The user request 162 can be received in various modalities such as, but not limited to, as a set of name-value pairs using an input GUI put forth by the attribute prediction system 100 or as a natural language based request. In an example, the user request 162 can include a spreadsheet with various features and data values for the features when multiple predictions for the attribute are desired for a plurality of customized equipment. For example, the cost predictions for multiple cranes of different specifications may be requested by providing a spreadsheet with the specification details along with the user request 162. The values of the various features are extracted from the user request 162. Furthermore, the attribute for which the predictions are desired is identified from the user request 162. Based on the attribute identified, the best scoring model that was selected for that attribute is requested by the attribute predictor 108 from the model processor 106. The best scoring model for that attribute is loaded and the data values of the features as obtained from the user request are plugged into the best scoring model to obtain the attribute prediction 180. In an example, various best scoring model-feature combinations can be generated for different attributes of various equipment or machinery. When a user request for a particular attribute of a specific piece of machinery or multiple pieces of machinery is received, then the best scoring model-feature combination of that particular attribute or machinery is selected. One or more instances of the selected best scoring model are loaded for generating the respective attribute predictions for each piece of machinery.

The predictions produced by the attribute predictor 108 can be conveyed to the user making the user request 162 via one of the user interfaces 140 such as an output GUI. In addition, the information used by the attribute predictor 108 may also be accessed by the recommendation generator 112 for generating recommendations for the customized equipment pertaining to the user request 162. In an example, the various features of the attribute e.g., cost, can be analyzed to identify features having the most or least impact. This enables identifying areas for cost savings in the manufacture of the customized equipment. Similarly, if the attribute pertains to demand for the customized equipment, the analysis by the recommendation generator 112 can identify the most contributing factors or the least contributing factors for the demand. In an example, the recommendation generator 112 can employ preconfigured templates or even natural language processing (NLP) application programming interfaces (APIs) for generating recommendations regarding the features of the predicted attribute.

When an actual value of the attribute is obtained, the actual value can be fed back to the attribute prediction system 100 at the feedback processor 114. The feedback processor 114 can estimate the variance between the actual value of the attribute and the predicted value of the attribute.

Based on the variance, the attribute prediction system 100 can fine tune the best scoring model to produce more accurate results. By way of illustration and not limitation, if the attribute pertains to a cost prediction, then the actual cost of the customized equipment can be fed back to the attribute prediction system 100 after the purchase transaction is completed in order to fine tune the best scoring model for cost if needed. The fine tuning may include providing training data to the best scoring model to produce more accurate results. Thus, the best scoring models for the various attributes are self-learning with each new data that is received and therefore, the accuracies of the best scoring models improve of time with usage.

Figure 2:
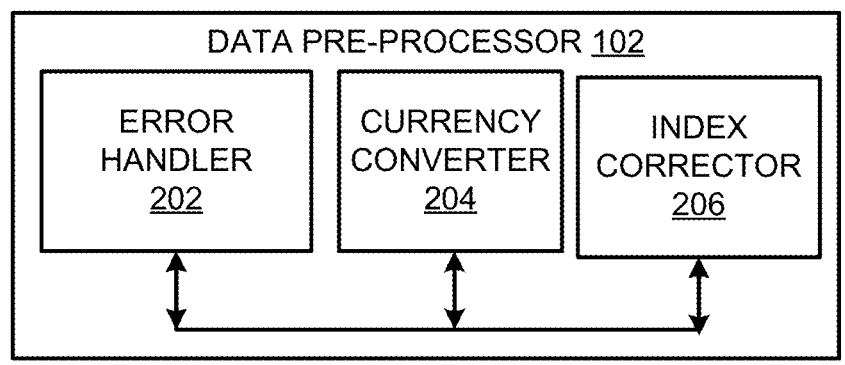
FIG. 2 shows a block diagram of a data pre-processor in accordance with the examples disclosed herein.

FIG. 2 shows a block diagram of the data pre-processor 102 in accordance with the examples disclosed herein. In an example, the historical data 150 can be accessed directly for model generation without further processing in an unadjusted view. However, such direct processing can lead to errors in the attribute predictions due to various reasons. Firstly, raw historical data which is not processed can include errors such as outliers or missing values. The data pre-processor 102 therefore, includes an error handler 202 which initially obtains a median value for each of the features in a data set to be used from the historical data 150. In an example, outlier correction can be carried out by interquartile range (IQR). IQR is a way of understanding the spread or dispersion of a set of numbers. IQR is defined as the difference between the upper quartile (the highest 25%) and the lower quartile (the lowest 25%) of a data set. The lower quartile is referred to as Q1, and the upper quartile is referred to as Q3, which technically makes the halfway point of the data set Q2, and the highest point Q4 IQR=Q3−Q1. The outliers may be identified by any values in the data set<Q1−3*IQR, and any values in the data set >Q3+3*IQR. Outliers in the data values associated with a given feature can be replaced with the corresponding median value for that attribute. Similarly, errors such as missing values are also processed by the error handler 202. In an example, if a feature has more than 40% missing values then such a feature may be discarded from being used for further processing such as in the feature combinations 174. However, if there are less than 40% missing values, then the missing values can be replaced with the median values as described above.

Another cause for errors in the predictions from the historical data 150 is that the historical data 150 can include cost numbers in different currencies. Therefore, using historic cost data without conversion to a common currency leads to errors. The data pre-processor 102 includes a currency converter 204 that is used to convert various currency amounts in the historical data 150 into a common currency. Moreover, as the historical data 150 includes data from different time periods, the data may become outdated and misrepresent the features that contribute to the attribute. An index corrector 206 is included in the data pre-processor 102 which applies a corresponding index correction to a given feature. For example, if the feature pertains to the cost of steel, then the index corrector 206 can apply a steel index corresponding to the particular year associated with the steel cost to obtain the updated data values for the current year. Similarly, other corresponding commodity indices or consumer index can be applied to the data values of the features in order to update the data to the current time period.

Figure 3:
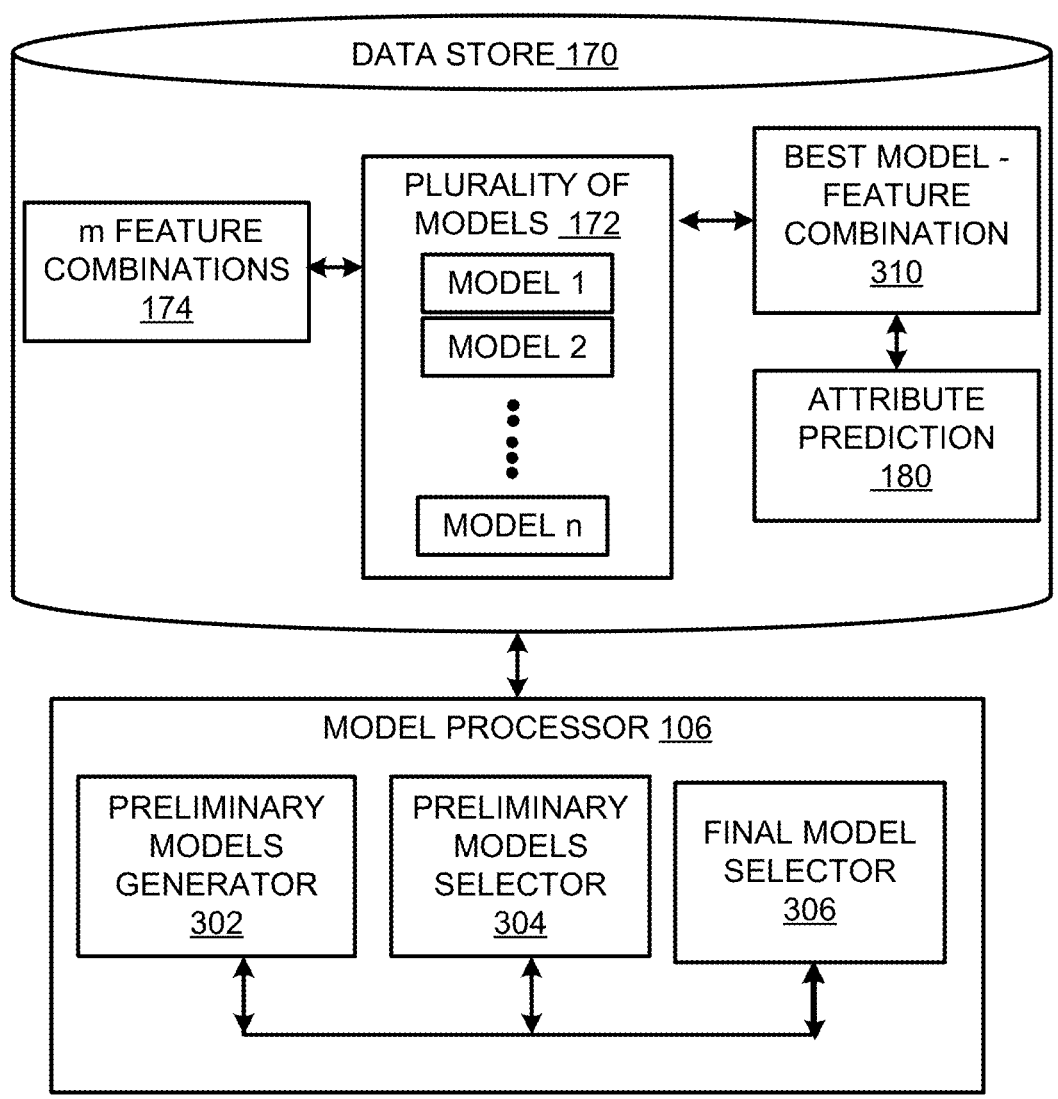
FIG. 3 shows a block diagram of a model processor in accordance with the examples disclosed herein.

FIG. 3 shows a block diagram of the model processor 106 in accordance with the examples disclosed herein. The model processor 106 includes a preliminary models generator 302 which accesses the feature combinations 174 and employs each of the feature combinations 174 with each of the plurality of models 172 including model 1, model 2 . . . model n (where n is a natural number). In an example, the plurality of models 172 can be implemented via methodologies such as but not limited to, linear, logarithmic, exponential, polynomials of order 2, 3, 4, Bayesian, Regressing, Extreme Gradient Boosting (XGBoost), support vector machines (SVMs), decision trees, random forest, neural networks, Generalized Linear Model (GLM), Gradient Boosting Machines (GBM), linear Support Vector Classifier (SVC) etc. Therefore, if there are m feature combinations (where m is a natural number) within the historical data 150 which can be used for the attribute prediction the preliminary models generator 302 can generate m×n model combinations. Out of the m×n preliminary model-feature combinations, the preliminary models selector 304 selects the top N models (where N is a natural number) using statistical selection criteria such as but not limited to, root mean square error (RMSE) method. In an example, the top N models may also be selected using multi-sample testing for consistency. The final model selector 306 accesses the top N model-feature combinations that were short-listed from the plurality of models 172 to further apply selection criteria such as mean absolute percentage error (MAPE). The model-feature combination with the lowest MAPE is selected as the best scoring model-feature combination 310 that can be used to generate the attribute prediction 180. Similarly, different model/feature combinations can be selected from different historical data sets for the prediction of different equipment attributes.

Figure 4:
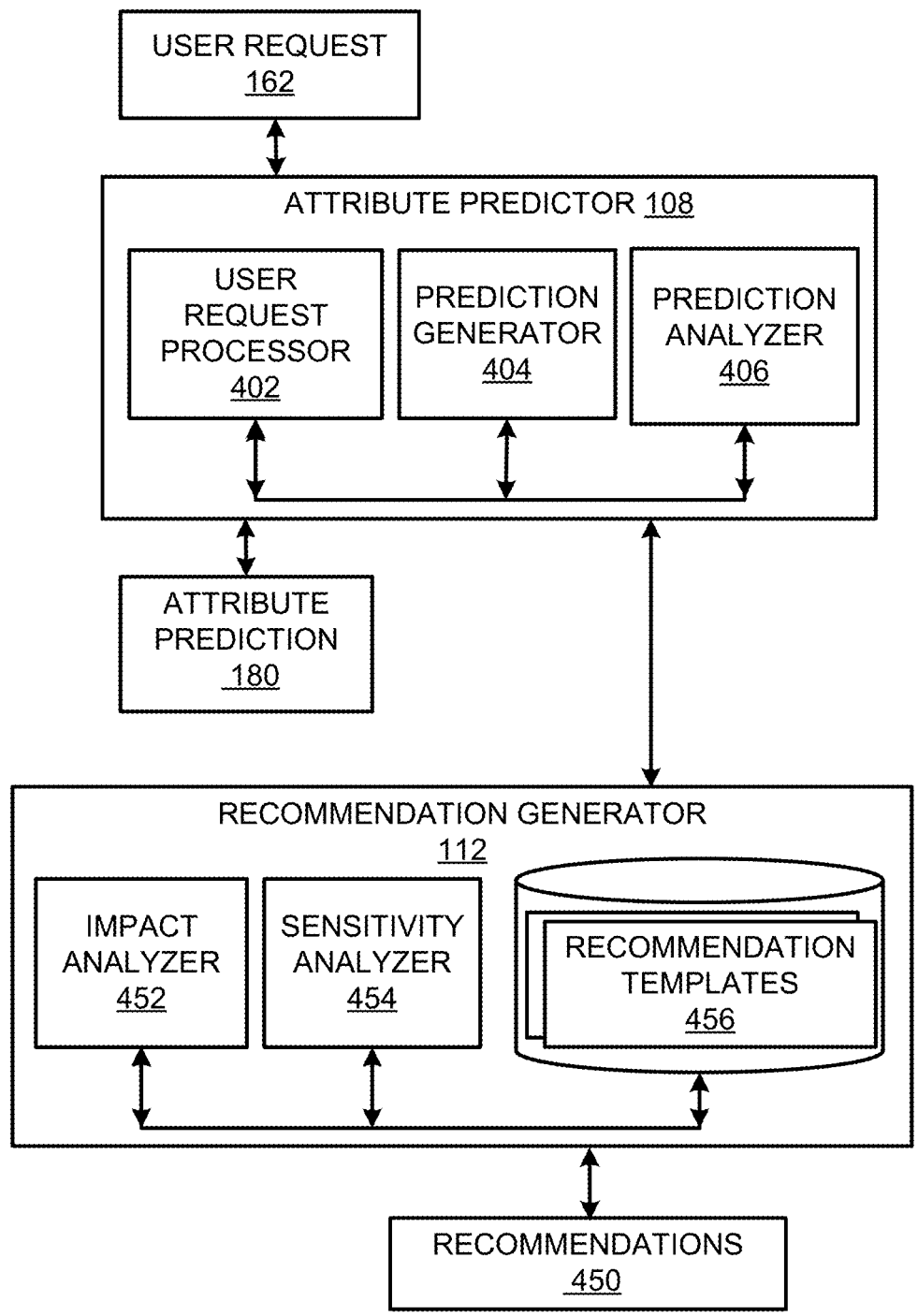
FIG. 4 shows the block diagrams of an attribute predictor and a recommendation generator in accordance with the examples disclosed herein.

FIG. 4 shows block diagrams of the attribute predictor 108 and the recommendation generator 112 in accordance with the examples disclosed herein. The attribute predictor 108 includes a user request processor 402, prediction generator 404 and prediction analyzer 406. In an example, the user request 162 may request one attribute for one particular equipment. As mentioned herein, the user request 162 for the attribute prediction can be received as name-value pairs from user interface controls of an input GUI from the GUIs 140 put forth by the attribute prediction system 100. The user request 162 may also be received as a series of keywords or as a natural language based request. In the later case, natural language processing (NLP) techniques including parsing, parts of speech (POS) tagging, semantic analysis of the sentences, keyword matching techniques can be used to identify the equipment and the attribute requested for the equipment. In an example, the user request 162 can be a batch request wherein one attribute is requested for a plurality of equipment, for example, cost for boilers of different specifications can be requested. In this case, the equipment and its specifications can be provided to the attribute prediction system 100 in the form of a spreadsheet. Pattern matching techniques can be employed by the user request processor 402 to identify the information received in the spreadsheet.

Information such as the attribute to be predicted, the features to be used for predicting the attribute and the equipment associated with the attribute etc. are obtained from the user request processor 402 by the prediction generator 404. The prediction generator 404 can select the best scoring model-features combination 310 from the data store 170 for predicting the attribute. The data values for the features in the best scoring model-features combination are obtained from the information gathered from the user request 162. The data values are plugged into the equation of the best scoring model from the best scoring model-features combination in order to obtain the attribute prediction 180.

The prediction analyzer 406 accesses the coefficients of the equation pertaining to the best scoring model used in the attribute prediction in order to enable providing recommendations. The coefficient values can be estimated using the data values from the user request 162 and transmitted to the recommendation generator 112.

The recommendation generator 112 includes an impact analyzer 452, a sensitivity analyzer 454 and a plurality of recommendation templates 456 for generating recommendations using the information provided by the prediction analyzer 406. The impact analyzer 452 can compare the values of the coefficients and identify those coefficients with high values. Those features corresponding to the coefficients of high values can be identified as having maximum impact on the attribute. Such information can be plugged into one of the plurality of recommendation templates for generating the recommendations 450. Referring back to the example of predicting the cost of the pedestal cranes, the above analysis can output high cost components of the pedestal crane thereby providing the user insights for cost savings. In an example, the impact analyzer 452 can be further configured to provide suggestions regarding the high cost components such as, suggesting alternative materials, sources or equipment specification changes.

Similarly, features to which the attribute value is most sensitive can also be identified by the sensitivity analyzer 454 as detailed further infra. For example, those features where a small change to the value of that feature can cause a large change to the attribute value are identified. The coefficients identified by the sensitivity analyzer 454 are again plugged into one of the recommendation templates 456 for the generation and transmission of the recommendations 450 to the user. It can be appreciated that if multiple equipment attribute predictions were requested, then multiple recommendations for the multiple pieces of equipment can be simultaneously produced by the recommendation generator 112 in accordance with the examples disclosed herein.

Referring to the example, wherein the coefficients pertain to features of the cost of a customized equipment, the coefficients would refer to the relationship between features and cost. Each of the coefficients could be directly proportional to the cost i.e., move along with the cost or the coefficients could be inversely proportional to the cost i.e., move opposite to the cost. Such relationships may exist between the coefficients and the cost regardless of whether the magnitude/values of the coefficients are high or low. The recommendation generator 112 can therefore, rank order the high impacting features and enables identifying the features that drive the cost. In turn, the recommendation generator 112 can enable designing or recommend specifications and features that suit the cost without compromising the functional requirements. By way of illustration and not limitation, below is an equation representing one of the model-feature combinations that can be used for estimating the cost of a crane:

$$\text{Cost} = 0.85 + 0.11 * (\text{lift\_capacity}) + 0.52 * (\text{boom\_length}) \quad \text{Eq. (1)}$$

In Eq. (1) above, the coefficient of the lift_capacity is 0.11 which indicates that the cost changes by $0.11/—for every one unit change in the lift_capacity feature. Similarly, the boom_length feature has a coefficient of 0.52 so that the cost increases by $0.52/—for every unit increase in the boom_length. When the lift_capacity feature is compared with the boom_length feature, it can be noted that the boom_length feature has a greater influence on the cost of the crane than the lift_capacity when standardized for units. Therefore, the cost of any equipment model or a make up with certain specifications related to the lift_capacity and boom_length would be impacted by these relationships and the cost can be predicted accordingly. Moreover, as the cost is more sensitive to boom_length, the recommendation generator 112 can generate a recommendation suggesting that a designer optimize on the boom_length feature.

Figure 5:
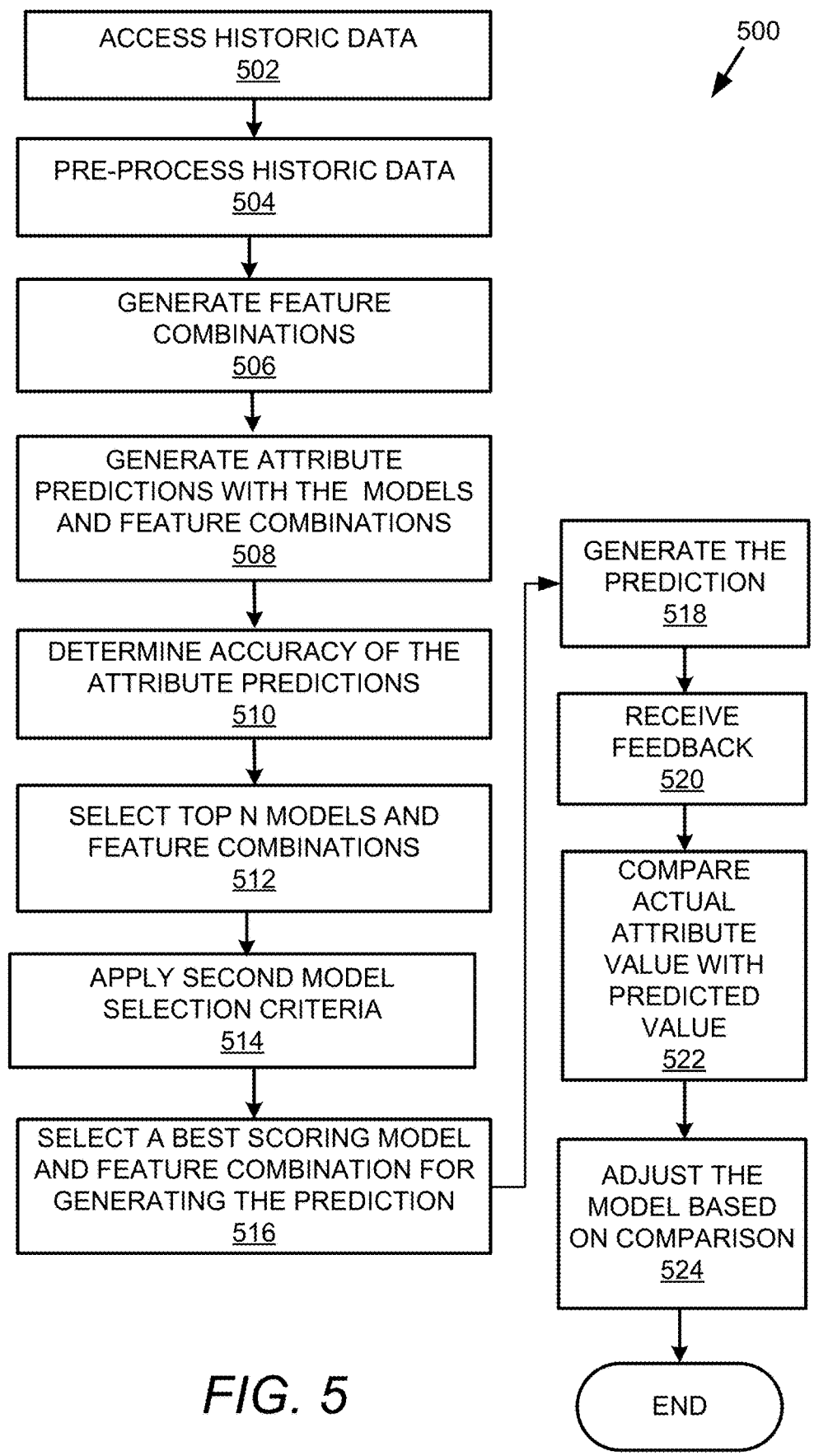
FIG. 5 shows a flowchart that details a method of obtaining the best scoring model and feature combinations for generating the attribute prediction in accordance with the examples disclosed herein.

FIG. 5 shows a flowchart 500 that details a method of obtaining the best scoring model and feature combinations for generating the attribute prediction in accordance with the examples disclosed herein. The method begins at 502 wherein domain specific historical data 150 is accessed. The equipment and the attributes of the equipment that are to be predicted can be peculiar to a domain and the historical data 150 can include prior records having not only the data values of the features employed in evaluating the attributes of the equipment and but also the corresponding data values for the attributes. The historical data 150 is pre-processed at 504 in order to minimize the errors and to enable generation of accurate attribute predictions.

At 506, the features of the equipment attribute are extracted from the historical data using processing techniques such as textual processing techniques and/or keyword matching and each possible combination of the features that contribute to the attribute are generated by initially identifying the various features from the historical data. In an example, the feature combinations 174 can be generated via programming code that includes processor-readable instructions that identify feature names from the historical data. For example, the plurality of feature combinations being generated are based on the data types of the features and operators that can be applied to the feature data types. Each of the possible feature combinations 174 is provided to each of the plurality of models 172 at 508. Multiple attribute predictions are thus obtained at 508 from by processing the feature combinations 174 and the plurality of models 172. The plurality of models 172 can include both statistical and ML models such as but not limited to, linear model, polynomial order 2, polynomial order 3, SVM, XGBoost, etc. As mentioned above, if there are m feature combinations and n models, then m×n attribute predictions are obtained at 508. The accuracy of the attribute predictions generated using each of the plurality of models 172 with each of the plurality of feature combinations are determined in the first selection cycle at 510 using first selection criteria including methodologies such as but not limited to RMSE etc. In an example, the top ten models can be selected based on the RMSE methodology. Additionally, multi-sample testing can be implemented wherein the models are tested on multiple sets of data values to select the top N models at 512, where N is a natural number. In an example, the top five models along with the corresponding possible feature combinations can be selected at 512. Second model selection criteria are then applied in a second selection cycle on the top N models at 514. The second model selection criteria applied at 514 can include but are not limited to, MAPE. The best scoring model or the best scoring model in conjunction with a particular feature combination with the least error is selected from the top N models at 516 as the best scoring model-feature combination for generating further attribute predictions.

The attribute prediction is generated at 518 upon receiving the user request 162 for the attribute prediction. The feature values needed to generate the attribute prediction can be obtained from the user request 162. At 520, the feedback including an actual value of the attribute can be received. For example, if the attribute pertains to the cost of the customized equipment, then the actual cost of the customized equipment after the purchase transaction can be obtained at 520. At 522, the actual attribute value obtained upon completing the purchase transaction is compared to the predicted value. The best scoring model used to generate the attribute prediction can be adjusted or fine-tuned at 524 based on the comparison. In an example, the variance can be estimated between the actual value and the predicted value of the attribute. If the variance is high, then the best scoring model can be fine-tuned for better accuracy. If the variance is low then the best scoring model is performing well and needs no further changes.

Figure 6:
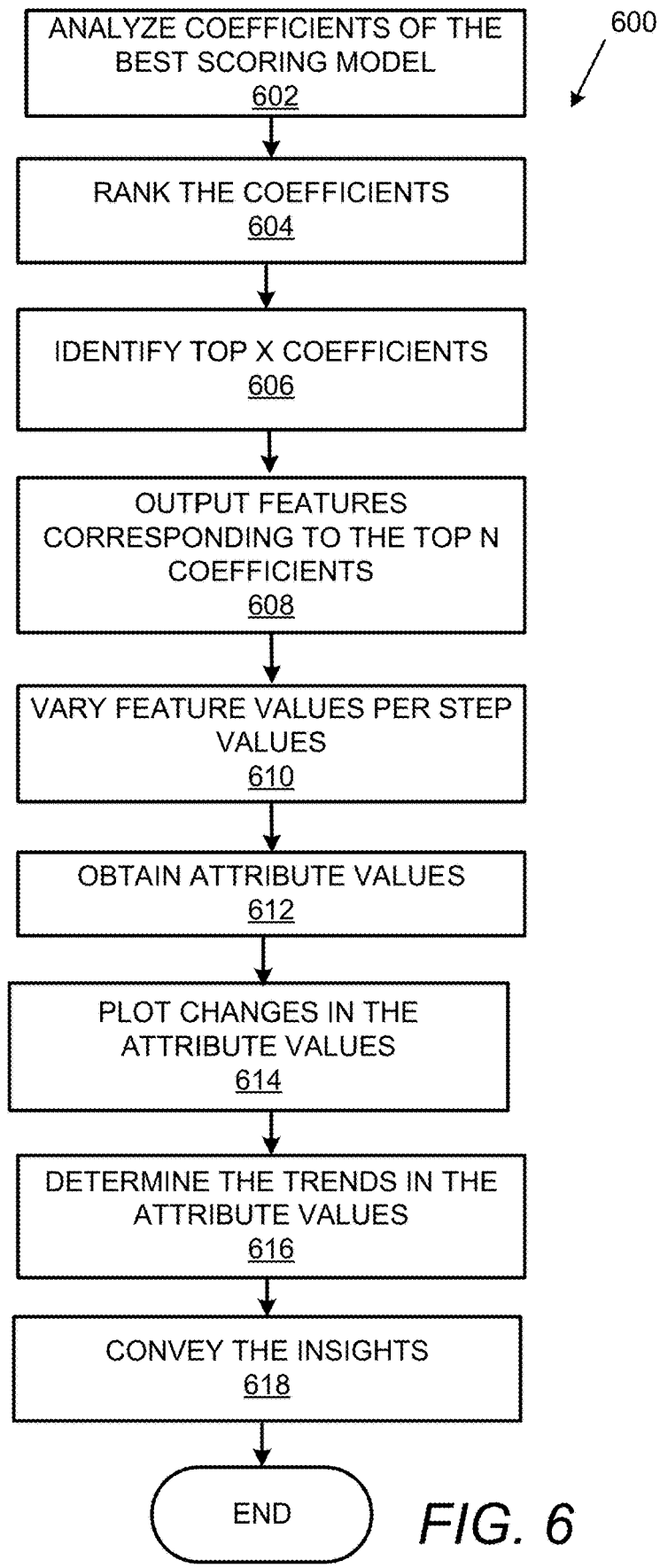
FIG. 6 shows a flowchart that details a method of providing recommendations based on insights in accordance with the examples disclosed herein.

FIG. 6 shows a flowchart 600 that details a method of providing recommendations based on insights regarding the predicted attribute of the customized equipment in accordance with the examples disclosed herein. The insights can be obtained by analyzing an equation representing the best scoring model in the best scoring model feature combination 310. More particularly, the various coefficients within the best scoring model pertaining to each of the features in the best scoring model feature combination 310 can be analyzed at 602. For example, the sign and magnitude or value of each of the coefficients from the best scoring model can be obtained as part of the analysis at 602. The coefficients can be ranked at 604 based on their magnitudes. At 606, a subset of the coefficients with the top X highest values (where X is a natural number) are identified. The features corresponding to the top X coefficients can be outputted at 608 as those features having the maximum impact on the predicted attribute. For example, the top three features having the highest impact on the predicted attribute can be outputted at 608.

In an example, the attribute prediction system 100 also employs sensitivity analysis in generating the insights so that those features to which the predicted attribute is most sensitive can be identified. In order to identify the sensitive features, the attribute prediction system 100 can allow the user to preset particular step values for applying to the coefficients corresponding to the various features. For example, the coefficients corresponding to the features can be incremented or decremented in steps of 5%, 10%, 20% etc. until a maximum or minimum value from the historical data 150 for the features are reached. Accordingly, at 610, the coefficients or the feature values are varied in accordance with the preset step values. The corresponding attribute values are obtained or predicted using the best scoring model features combination at 612 with the variation of each step value for each of the features. The corresponding attribute values for each of the step values for each of the features are plotted at 614. The trend in the relationship between each of the features and the corresponding attribute value that is produced at 614 can be observed or plotted at 616. Various trends such as but not limited to, linear, non-linear, increasing or decreasing trends i.e., whether the output attribute value is directly or inversely proportional to each of the input feature value(s) can be observed from the plots generated at 616. The magnitude of change in the attribute value due to the step value of a feature and the nature of the change (i.e., increasing or decreasing) are conveyed as insights or recommendations 450 to the user at 618.

Figure 7:
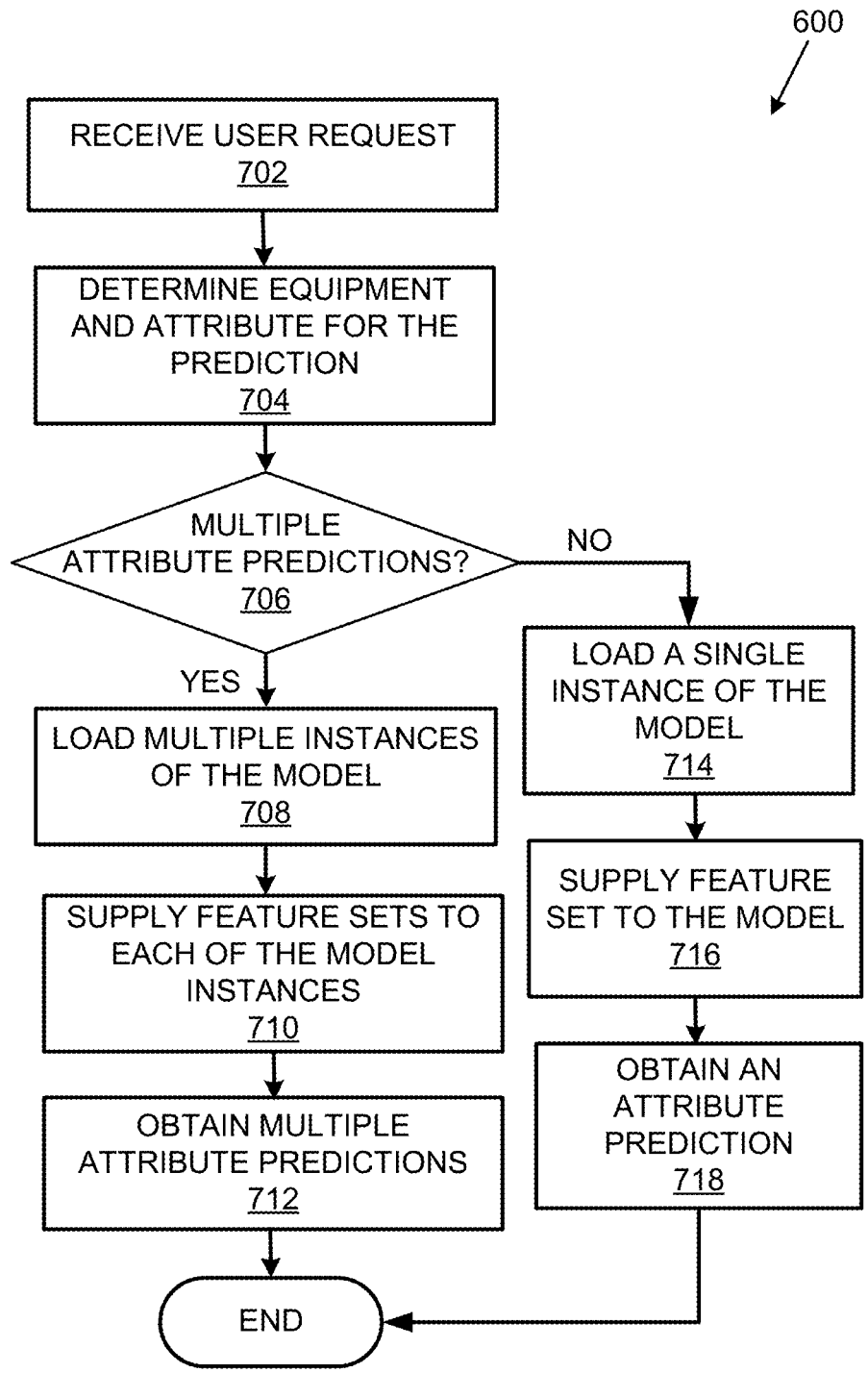
FIG. 7 shows a flowchart that details a method of processing the user's request in accordance with the examples disclosed herein.

FIG. 7 shows a flowchart 700 that details a method of processing the user's request in accordance with the examples disclosed herein. At 702, the user request 162 for prediction of the attribute is received. At 704, the user request 162 is processed in order to determine information such as the customized equipment included in the request and the attribute prediction being requested. If the user request 162 is received in a natural language based query, then NLP processing such as parsing, tokenizing and keyword extraction can be used. In an example, the user can seek prediction of an attribute to multiple pieces of equipment with different specifications. When the attribute predictions for multiple pieces of equipment are requested, then the features or the specifications for the customized equipment pieces can be provided to the attribute prediction system 100 in a spreadsheet with the user request 162. Accordingly, it is determined at 706 if multiple attribute predictions are being requested. If yes, the method proceeds to 708 wherein multiple instances of the best scoring model and feature combination 310 for that attribute are loaded into the memory of the computing device generating the attribute predictions. The feature set for each of the multiple pieces of machinery can be supplied to the corresponding instance of the best scoring model at 710. Each instance of the best scoring model generates an attribute prediction for one of the multiple pieces of machinery based on the corresponding feature set processed by that particular instance of the best scoring model. Therefore, multiple attribute predictions are simultaneously generated in a batch process wherein each attribute prediction respectively corresponds to one of the multiple pieces of machinery are obtained at 712.

If it is determined at 706 that the attribute prediction for a single piece of machinery or equipment is being requested, then a single instance of the best scoring model is instantiated at 714. The corresponding feature set is analyzed by the single instance of the best scoring model at 716. An attribute prediction for the single piece of machinery is obtained at 718.

Figure 8:
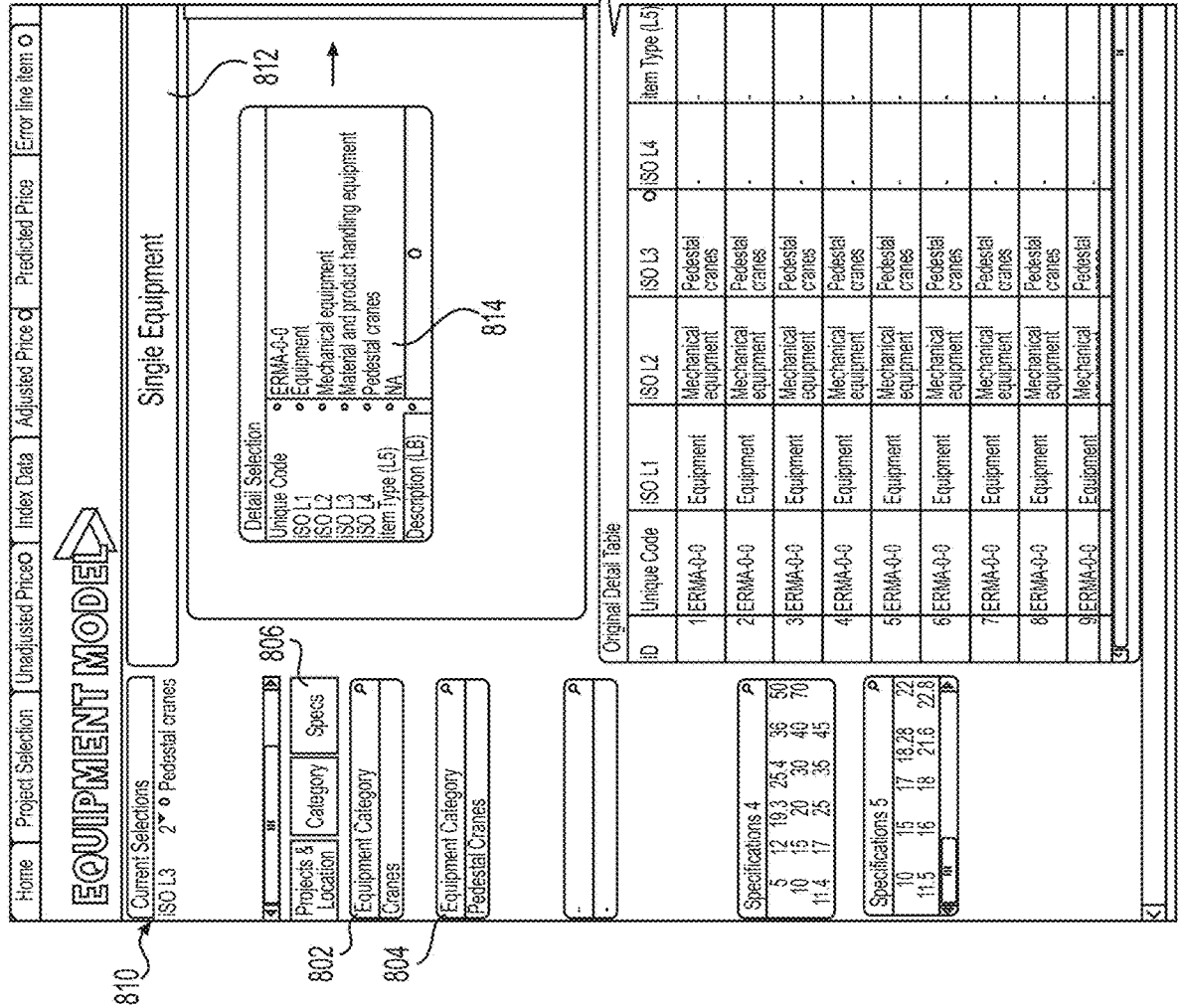
FIG. 8 shows a user interface of the attribution prediction system in accordance with the examples disclosed herein.
Figure 8:
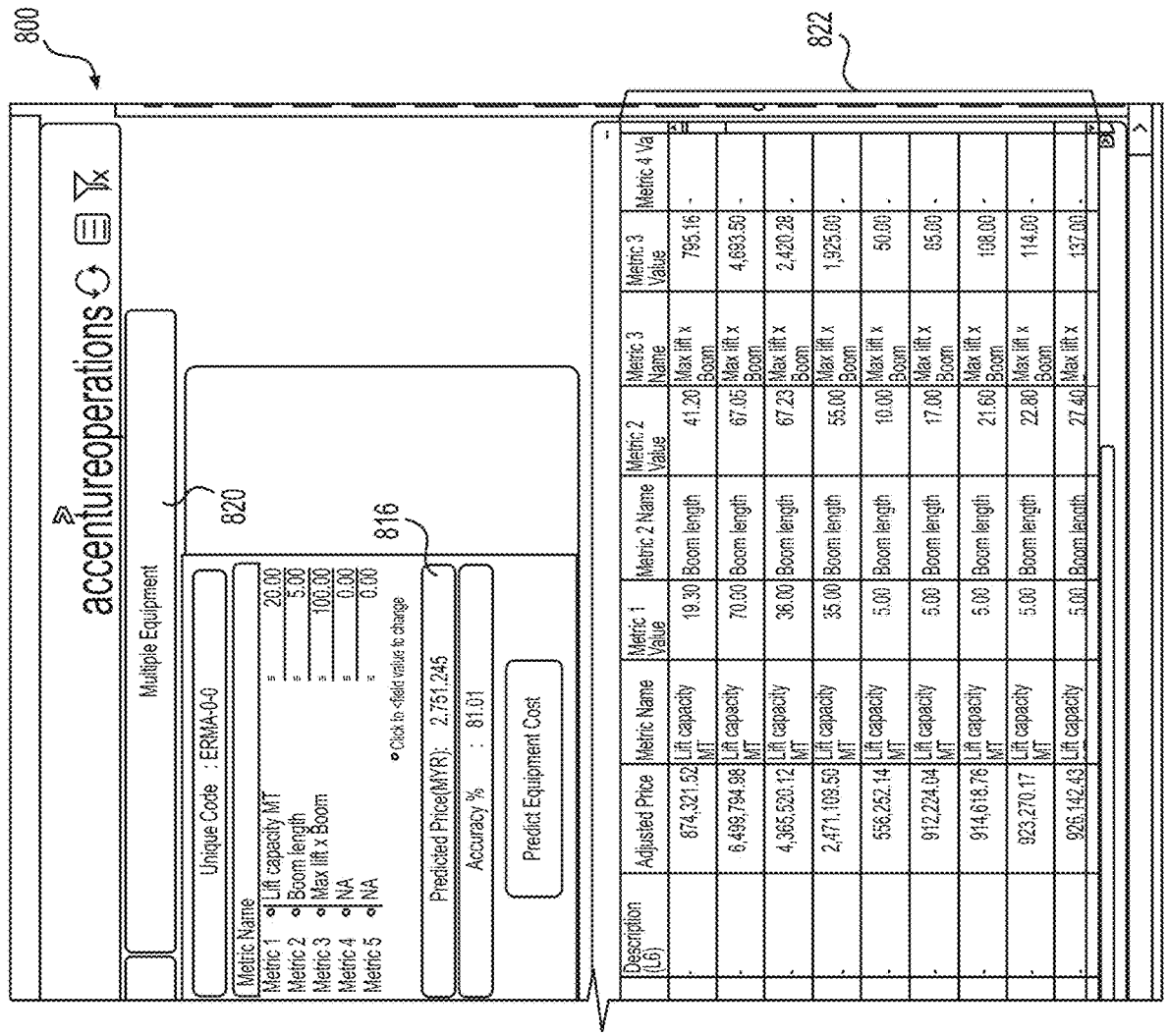

As mentioned herein, the user interfaces 140 can be configured to receive the user requests and display outputs including the attribute predictions, insights and recommendations generated by the attribute predictions system 100. FIG. 8 shows a user interface 800 of the attribution prediction system 100 in accordance with the examples disclosed herein. The input panel 810 allows a user to input the details regarding the equipment, such as the equipment category 802, equipment type 804 and the specs 806 for the equipment. A spreadsheet 822 including the specifications for multiple pieces of equipment or new data values for the features as provided by the user are shown. A tab for a single equipment 812 is selected and accordingly the predicted attribute 816 for the single equipment is shown. The detailed specifications 814 of the single equipment 812 are also shown. The predicted price of the single equipment and the accuracy of the prediction 818 are also seen. A tab 820 for multiple equipment can be selected if attribute predictions for multiple pieces of equipment are desired.

Figure 9:
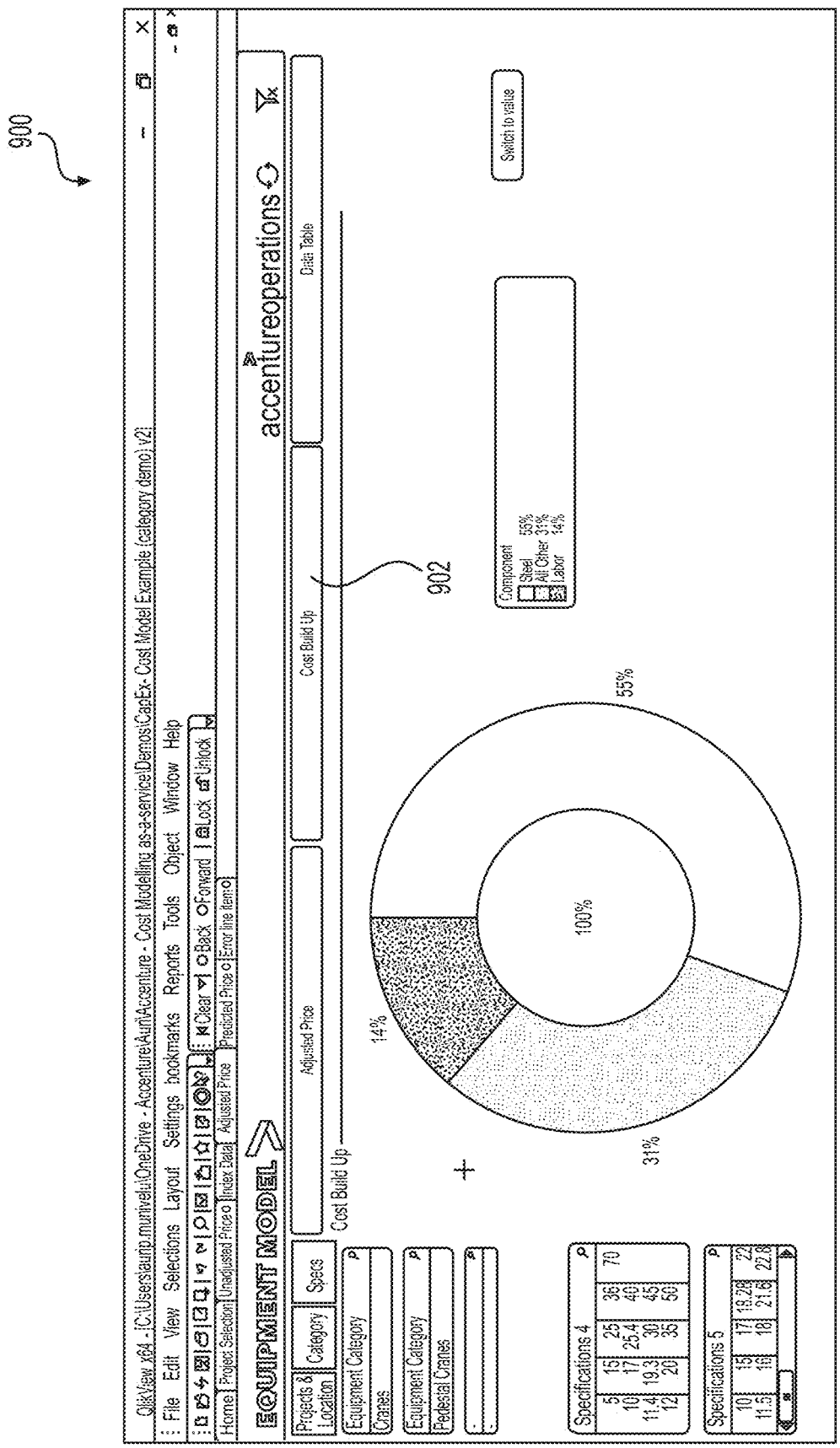
FIG. 9 shows an example user interface displaying the insights extracted from the best scoring model in accordance with the examples disclosed herein.

FIG. 9 shows an example user interface 900 displaying the insights extracted from the best scoring model in accordance with the examples disclosed herein. In particular, the cost break up 902 of a pedestal crane as obtained from the best scoring model i.e., the equipment model is shown. It can be seen that the cost attribute of the pedestal crane includes three significant features. About 14% cost of the pedestal crane includes labor, 55% of the cost includes the cost of steel and 31% includes other costs. Therefore, insights regarding lowering the equipment costs such as reducing labor costs or steel costs can be provided to the user via the user interface 900.

Figure 10:
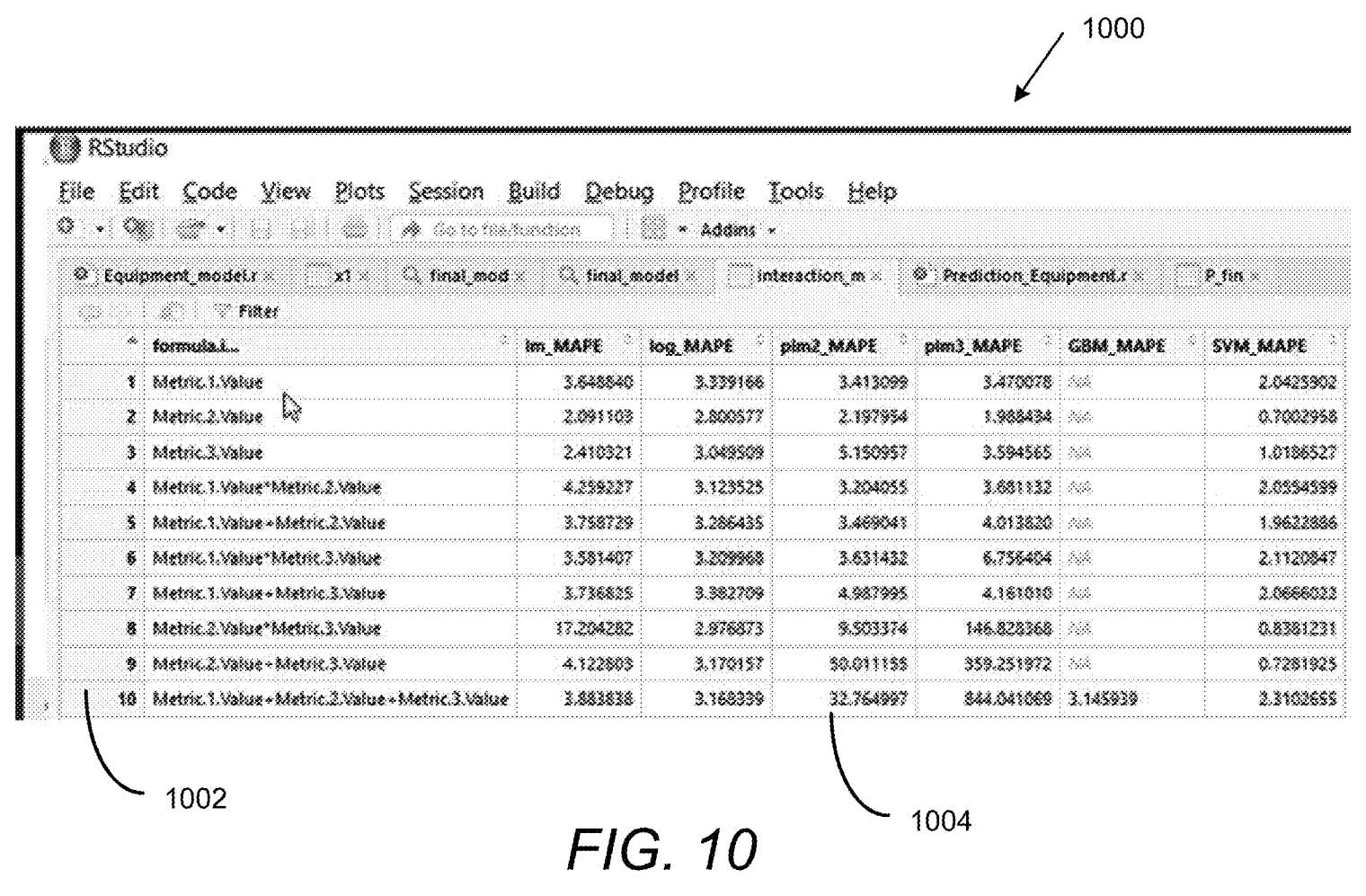

FIG. 10 shows a table 1000 including a model-feature matrix wherein the various possible feature combinations and the scores when applied to different statistical and ML models are shown. Three metrics are used with the models in accordance with the examples disclosed herein. Various combinations of the values of metric.1, metric.2 and metric.3 are generated as shown at 1002 using the addition and multiplication operators. The metric combinations are used with different models including the logarithmic model, GBM model, and the SVM model at 1004. When the MAPE scores of different models are compared, it can be seen that the SVM model produces the lowest MAPE scores for each of the feature combinations. Accordingly, the SVM can be used to generate the attribute prediction.

FIG. 11 illustrates a computer system 1100 that may be used to implement the AI-based equipment attribute prediction system 100. More particularly, computing machines such as desktops, laptops, smartphones, tablets and wearables which may be used to generate or access the data from the attribute prediction system 100 may have the structure of the computer system 1100. The computer system 1100 may include additional components not shown and that some of the process components described may be removed and/or modified. In another example, a computer system 1100 can sit on external-cloud platforms such as, Amazon Web Services, AZURE® cloud or internal corporate cloud computing clusters, or organizational computing resources, etc.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.11x LAN, a 3G or 4G mobile WAN or a Wi Max WAN, and a computer-readable or processor-readable storage medium/media 1106. Each of these components may be operatively coupled to a bus 1108. The processor-readable medium 1106 may be any suitable medium which participates in providing instructions to the processor(s) 1102 for execution. For example, the processor-readable medium 1106 may be non-transitory or non-volatile medium, such as a magnetic disk or solid-state non-volatile memory or volatile medium such as RAM. The instructions or modules stored on the processor-readable medium 1106 may include machine-readable instructions 1164 executed by the processor(s) 1102 to perform the methods and functions of the attribute prediction system 100.

The attribute prediction system 100 may be implemented as software stored on a non-transitory processor-readable medium and executed by the one or more processors 1102. For example, the processor-readable medium 1106 may store an operating system 1162, such as MAC OS, MS WINDOWS, UNIX, or LINUX, and code 1164 for the attribute prediction system 100. The operating system 1162 may be multi-user, multiprocessing, multitasking, multithreading, real-time and the like. For example, during runtime, the operating system 1162 is running and the code for the attribute prediction system 100 is executed by the processor(s) 1102.

The computer system 1100 may include a data storage 1110, which may include non-volatile data storage. The data storage 1110 stores any data used by the attribute prediction system 100. The data storage 1110 may be used to store the feature values, the best scoring model and feature combinations, the predicted attributes and insights generated by the attribute prediction system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based equipment attribute prediction system comprising:
at least one processor;
a non-transitory processor readable medium storing machine-readable instructions that cause the at least one processor to:
access historical data related to at least one attribute of at least one customized equipment wherein the historical data includes data values tracking the equipment attribute and features of the equipment attribute over different time periods;
extract the features of the equipment attribute from the historical data using text processing techniques;
generate a plurality of feature combinations that include each possible combination of the features of the equipment attribute from the historical data, the plurality of feature combinations are generated based on a data type of the features and operators that can be applied to the data types;
train a plurality of AI models implementing different methodologies for generating predictions for the equipment attribute;
obtain a plurality of attribute predictions for the equipment attribute from the plurality of AI models, by applying each of the possible feature combinations to each of the plurality of AI models;
select a top N AI models and corresponding possible feature combinations from the plurality of AI models wherein N is a natural number, wherein the top N AI models are selected using model selection criteria that include an error estimation of the plurality of attribute predictions and multi-sample testing for consistency;
identify a best scoring AI model of the top N AI models and a particular feature combination from the possible feature combinations for the equipment attribute using a scoring scheme;
load into the non-transitory, processor-readable medium a single instance of the best scoring AI model in response to a user request for prediction for the equipment attribute for a single piece of the at least one customized equipment;
obtain from the single instance of the best scoring AI model and the particular feature combination, an attribute prediction for the equipment attribute in accordance with a user request wherein the user request includes new data values for the features included in the possible feature combination corresponding to the best scoring AI model; and
derive at least one recommendation by analyzing coefficients of an equation representing the best scoring AI model based on the possible feature combination corresponding to the best scoring AI model and the attribute prediction;
calculate variance between an actual value of the equipment attribute and the attribute prediction; and further train the best scoring AI model on the actual value based at least on the variance.

2. The AI-based equipment attribute prediction system according to claim 1, the non-transitory processor readable medium further comprising instructions that cause the processor to:
pre-process the historical data by replacing one or more of missing values and outliers in data values of the features.

3. The AI-based equipment attribute prediction system according to claim 2, wherein the instructions for pre-processing the historical data further comprise instructions that cause the processor to:
replace the missing values and outliers with corresponding median values obtained from the data values of the features.

4. The AI-based equipment attribute prediction system according to claim 2, wherein the instructions for pre-processing the historical data further comprise instructions that cause the processor to:
obtain updated data values of each of the features from the different time periods by applying corresponding indices on the data values of each of the features from the different time periods; and
convert the data values of currency-based features to a common currency.

5. The AI-based equipment attribute prediction system according to claim 1, wherein the instructions for selecting the top N AI models using model selection criteria that include the error estimation further comprise instructions that cause the processor to:
employ root mean square error (RMSE) for the error estimation for the selection of the top N AI models; and
test the plurality of AI models with multiple sets of the data values for the attribute.

6. The AI-based equipment attribute prediction system according to claim 5, wherein the instructions for selecting the top N AI models further comprise instructions that cause the processor to:
score the plurality of AI models based on the RMSE and consistency from testing on the multiple sets of the data values.

7. The AI-based equipment attribute prediction system according to claim 1, wherein the instructions for selecting the top N AI models further comprise instructions that cause the processor to:
rank the plurality of AI models based on the scores for the selection of the top N AI models.

8. The AI-based equipment attribute prediction system according to claim 1, wherein the instructions to identify a best scoring AI model of the top N AI models using the scoring scheme further comprise instructions that cause the processor to:
identify a best scoring AI model of the top N AI models using mean absolute percentage error (MAPE).

9. The AI-based equipment attribute prediction system according to claim 1, wherein the non-transitory processor readable medium further comprising instructions that cause the processor to:
receive user input providing data values for the features for generating the attribute prediction.

10. The AI-based equipment attribute prediction system according to claim 1, wherein the equipment pertains to a customized equipment and the equipment attribute pertains to a price of the customized equipment.

11. The AI-based equipment attribute prediction system according to claim 10, wherein the instructions to derive at least one recommendation further comprise instructions that cause the processor to:
analyze coefficients of an equation representing the best scoring AI model wherein the coefficients correspond to each of the features included in the possible feature combination of the best scoring AI model; and
determine high cost components of the price of the customized equipment based on a subset of the coefficients with high values.

12. The AI-based equipment attribute prediction system according to claim 1, wherein the non-transitory processor readable medium further comprising instructions that cause the processor to:
receive an actual cost of the at least one customized equipment, wherein the equipment attribute includes the actual cost;
obtain the variance between the attribute prediction and the actual cost.

13. The AI-based equipment attribute prediction system according to claim 1, wherein the plurality of AI models are implemented based on methodologies including linear, logarithmic, exponential, polynomials of order 2, 3, 4, Bayesian Regressing, Extreme Gradient Boosting (XGBoost), Support Vector Machines (SVMs), decision trees, random forests, neural networks, Generalized Linear Model (GLM), Gradient Boosting Machines (GBMs), and linear Support Vector Classifiers (SVCs).

14. An artificial intelligence (AI) based equipment attribute prediction generating method comprising:
accessing historical data related to an attribute of at least one equipment wherein the historical data includes data values tracking the equipment attribute and features of the equipment attribute over different time periods;
generating a plurality of feature combinations from the historical data, wherein the plurality of feature combinations include each possible combination of the features of the equipment attribute;
training a plurality of AI models implementing different methodologies for generating predictions for the equipment attribute;
obtaining a plurality of attribute predictions by applying each possible feature combination to each of the plurality of AI models;
selecting a top N AI models and corresponding possible feature combinations from the plurality of AI models using model selection criteria, wherein N is a natural number and the model selection criteria include error estimations of the plurality of attribute predictions;
identifying a best scoring AI model of the top N AI models and a particular feature combination from the possible feature combinations for the equipment attribute using a scoring scheme;
receiving a user request for prediction of the attribute for a plurality of pieces of the equipment;
loading into a non-transitory processor-readable storage medium multiple instances of the best scoring AI model;
obtaining a respective attribute prediction for each piece of the plurality of pieces of equipment from each instance of the multiple instances of the best scoring AI model in accordance with a user request wherein the user request includes a plurality of sets of new data values for features included in the possible feature combination corresponding to the best scoring AI model;

deriving recommendations for one or more of the plurality of equipment pieces, the recommendations being derived based on the possible feature combinations corresponding to the best scoring AI model and the respective attribute predictions of the one or more equipment pieces;

calculating variances between actual values of the equipment attribute obtained for the plurality of equipment pieces from multiple instances of the best scoring AI model and the respective attribute prediction; and further training the best scoring AI model on the actual values based at least on the variances.

15. The AI-based equipment attribute prediction generating method of claim 14, further comprising:

receiving, via a spreadsheet, the plurality of sets of new data values for the features for the generation of the respective attribute predictions.

16. The AI-based equipment attribute prediction generating method of claim 14, wherein the attribute pertains to demand for each of the plurality of equipment pieces that includes customized equipment.

17. The AI-based equipment attribute prediction generating method of claim 14, further comprising:

analyzing coefficients of an equation representing the best scoring AI model wherein the coefficients correspond to each of the features included in the possible feature combination of the best scoring AI model.

18. The AI-based equipment attribute prediction generating method of claim 17, further comprising:

incrementing the new data values for the features by preset step values;

obtaining new attribute predictions for each incremented data value of each of the features;

detecting trends in the new attribute predictions via plotting the new attribute predictions; and identifying sensitivity of the attribute of each of the customized equipment to each of the features based on the trends.

19. A non-transitory processor-readable storage medium comprising machine-readable instructions that cause a processor to:

access historical data related to an attribute of at least one equipment wherein the historical data includes data values tracking the equipment attribute and features of the equipment attribute over different time periods;

generate a plurality of feature combinations that include each possible combination of the features of the equipment attribute from the historical data, the plurality of feature combinations are generated based on a data type of the features and operators that can be applied to the data types;

train a plurality of AI models implementing different methodologies for generating predictions for the equipment attribute;

obtain a plurality of attribute predictions by applying each possible feature combination to each of the plurality of AI models;

select a top N AI models and corresponding possible feature combinations from the plurality of AI models wherein N is a natural number, wherein the top N AI models are selected using model selection criteria that include an error estimation of the plurality of attribute predictions and multi-sample testing for consistency;

identify a best scoring AI model of the top N AI models and a particular feature combination from the possible feature combinations for the equipment attribute using a scoring scheme;

load into the non-transitory, processor-readable medium, a single instance of the best scoring AI model in response to a user request for prediction for the equipment attribute for a single piece of the at least one customized equipment;

obtain from the single instance the best scoring AI model and the particular feature combination, an attribute prediction in accordance with a user request wherein the user request includes new data values for the features included in the possible feature combination corresponding to the best scoring AI model;

derive at least one recommendation by analyzing coefficients of an equation representing the best scoring AI model based on the possible feature combination corresponding to the best scoring AI model and the attribute prediction;

calculate variance between an actual value of the equipment attribute and the attribute prediction; and further train the best scoring AI model on the actual value based at least on the variance.

* * * * *